Patented Oct. 13, 1925.

1,557,491

UNITED STATES PATENT OFFICE.

LAURENCE WILLIAM CODD, OF NORTHWICH, ENGLAND.

PRODUCTION OF ALKALI-SILICATE SOLUTION.

No Drawing.   Application filed May 5, 1923.   Serial No. 637,021.

*To all whom it may concern:*

Be it known that I, LAURENCE WILLIAM CODD, a subject of the King of Great Britain, residing at Northwich, in the county of Chester and Kingdom of England, have invented certain new and useful Improvements in or Relating to Production of Alkali-Silicate Solutions, of which the following is a specification.

The present well known industrial method of making commercial silicate of soda is by fusing together sodium carbonate and sand and subsequently dissolving the glass in water.

By this procedure it is difficult to obtain a glass containing more than 4 (molecular) parts of $SiO_2$ to 1 of $Na_2O$; also the difficulties of dissolving such high ratio silicate glass in water are very great, and as far as I am aware, solutions of a ratio higher than about 3.9 have not hitherto been known.

It is the object of this invention to provide an improved process for preparing water glass of a high ratio of silica to soda. Further objects are to prepare certain novel solutions of water glass of special properties as regards high ratio of silica to soda, which solutions may possess a critical viscosity which makes them very valuable as adhesives. A further object is to provide a process by which it is possible to make caustic soda and a high ratio water glass in one operation.

I have discovered that it is possible to prepare solutions of silicate of soda containing 4, 5, 6 or even more parts of $SiO_2$ to 1 part of $Na_2O$ by the following procedure:—

I take a sodium silicate solution, for example a solution made by the fusion process, containing 3 or 3½ parts of $SiO_2$ (or less) to 1 of $Na_2O$ and subject this to the action of an electric current in any suitable cell in such a manner that the desired amount of sodium is removed from the solution. Solutions of the viscosity or concentration usual in commerce can be prepared by electrolyzing a dilute solution and then concentrating the electrolyzed solution. By my process it is therefore possible to enrich in silica a low ratio water glass which can be prepared by fusion at a lower temperature and is more readily soluble than a high ratio water glass.

The invention further consists in a process by which sodium carbonate can be converted into caustic soda and a high ratio sodium silicate solution by first preparing a low ratio sodium silicate solution by fusion and electrolyzing this solution as described and recovering the caustic soda. The invention does not include the manufacture of silicic acid by the electrolysis of sodium silicate solution, since according to my process the reaction is stopped at an intermediate stage when the ratio is less than fifteen to one.

In my process the electrolysis is performed in a limited manner and the conditions of concentration, and current density and agitation are all so chosen that substantial deposition of silica is avoided; further the process is stopped at a stage when a stable water glass is obtained, i. e., a solution which does not set to a jelly on standing.

Care must be taken to ensure that the initial concentration of the silicate of soda solution is not too high otherwise silica is separated at the anode, e. g., as a sandy precipitate, when the process is much less efficient.

The solution should not be too dilute otherwise the electrolyzed solution becomes turbid on concentration. The limits of percentage concentration which give the most efficient results depend on the ratio of silica to soda desired in the final product and must therefore be determined by trial. If other concentrations are used, the operation is more difficult because the silica may operate out during electrolysis or during concentration.

The electrolysis can be carried to any desired point but it is limited by the fact that the final product according to the invention is "water glass" as distinguished from silica gel or silicic acid hydrosol or a silicic acid jelly containing small quantities of alkali. As the soda is removed the conductivity of the solution falls and total removal of soda involves considerable electrical inefficiency.

The solution of a sodium silicate is then concentrated to any desired degree, e. g., to a specific gravity of 1.225 for a solution of ratio 4.2 to 1.

The caustic soda produced at the cathode can be recovered by any suitable method.

*Example.*

A solution of sodium silicate containing 7%, $SiO_2$ $$\left(\text{ratio } \frac{SiO_2}{Na_2O} = 3.3\right)$$

was electrolyzed in a cell consisting of two compartments between a rotating platinum anode and a mercury cathode, using an anode current density of approximately 4.0 amperes per square decimeter.

The ratio $$\frac{SiO_2}{Na_2O}$$

in the anolyte was observed from time to time with the following results:—

| Time from start: minutes. | Ratio. |
|---|---|
| 0 | 3.3 |
| 10 | 3.7 |
| 30 | 4.5 |

The anode should be rotated or the liquid should be set in rotation about a fixed anode, as rapidly as conveniently possible.

Such rapid rotation, in conjunction with the choice of suitable concentration and current density is an important feature in avoiding any substantial separation of gelatinous or precipitated silica during the electrolysis.

Under the conditions of this experiment it is found that with increase of strength of solution it becomes more difficult to prevent separation of silica, e. g., a 10% solution is much more difficult to use than one of 7% ($SiO_2$), whereas with a 5% solution the final product becomes turbid on concentration.

Solutions of a ratio of 4 to 1 (or more than 4) are believed to be novel. Such solutions possess a viscosity-concentration curve which shows a sudden bend so that a solution of a specific gravity of 1.225 (ratio 4.2 to 1) increases in viscosity extremely rapidly when concentrated. Such high-ratio solutions concentrated to this critical concentration are very important commercially. Of course, this critical concentration varies with the ratio but I have given an example for the ratio 4.2 to 1 and the concentration is easily determined by trial for other ratios.

I do not claim solutions thickened by the addition of acids to sodium silicate solutions and I use the terms "sodium silicate solutions" and "water-glass" as excluding such mixtures of sodium silicate with substantial quantities of sodium chloride or sodium sulphate.

I declare that what I claim is:—

1. The process of making alkali silicates of high ratio of silica to soda solutions which comprises subjecting an alkali silicate solution to limited electrolysis without substantial separation of silica until a solution is obtained in which the ratio of silica to soda is less than fifteen to one.

2. The process of making concentrated sodium silicate solutions of high ratio of silica to soda which comprises electrolyzing a dilute sodium silicate solution to remove soda therefrom and then concentrating the electrolyzed solution.

3. The process of making concentrated sodium silicate solutions of high ratio of silica to soda which comprises electrolyzing a dilute sodium silicate solution to remove soda therefrom and then concentrating the electrolyzed solution until a solution of critical viscosity is obtained.

4. The process of electrolyzing a sodium silicate solution to remove soda therefrom until the molecular ratio of silica to soda is at least four to one but not sufficient to cause jellification.

5. The process of electrolyzing a sodium silicate solution to remove soda therefrom until the molecular ratio of silica to soda is between 4 and 4.5 to one.

6. The process of electrolyzing a sodium silicate solution containing about 7% $SiO_2$ to remove soda therefrom and discontinuing the electrolysis when the ratio of silica to soda is less than 15 to 1.

7. The process of electrolyzing to a limited extent a sodium silicate solution containing between 5 and 15 per cent $SiO_2$ with such vigorous agitation that substantial deposition of silica is avoided so as to produce a stable water glass solution.

8. The process of producing caustic soda and a stable high ratio water glass which consists in electrolyzing to a limited extent a solution of sodium silicate to remove soda therefrom, collecting the sodium hydroxide, and collecting the stable water glass solution so produced.

9. The process of electrolyzing sodium silicate solution with a mercury cathode under such conditions and to such a limited extent that sodium hydroxide and a stable high-ratio water glass are obtained as final products.

10. The process of producing caustic soda and a stable high-ratio water glass which consists in electrolyzing to a limited extent a solution of sodium silicate to remove soda therefrom, collecting the sodium hydroxide, collecting the stable water glass solution so produced and concentrating the water-glass solution to a substantial extent.

11. Sodium silicate in which the molecular proportion of silica to soda is more than four and less than fifteen.

12. Stable solutions of sodium silicate containing not less than four and not more than fifteen molecular proportions of silica to one of soda.

13. Solutions of sodium silicate containing between 4 and 4.5 molecular proportions of silica to one of soda.

14. Stable solutions of sodium silicate containing not less than four but less than fifteen molecular proportions of silica to one of soda and of such concentration that the viscosity increases disproportionately on removal of water.

15. Clear concentrated solutions of sodium silicate containing between 4.1 and 4.5 molecular proportions of silica to one of soda.

In witness whereof, I have hereunto signed my name this 10th day of April, 1923.

LAURENCE WILLIAM CODD.